(12) United States Patent
Hecht et al.

(10) Patent No.: US 9,957,379 B2
(45) Date of Patent: May 1, 2018

(54) STRUCTURAL COMPOSITE MATERIALS WITH HIGH STRAIN CAPABILITY

(75) Inventors: Daniel H. Hecht, Fort Worth, TX (US); William R. Garver, Cedar Hill, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days. days.

(21) Appl. No.: 13/342,566

(22) Filed: Jan. 3, 2012

(65) Prior Publication Data
US 2013/0171441 A1 Jul. 4, 2013

(51) Int. Cl.
*B32B 5/08* (2006.01)
*B32B 37/14* (2006.01)
(Continued)

(52) U.S. Cl.
CPC ............... *C08K 7/22* (2013.01); *B32B 18/00* (2013.01); *B82Y 30/00* (2013.01); *C04B 35/80* (2013.01); *C04B 35/83* (2013.01); *C04B 2235/526* (2013.01); *C04B 2235/5224* (2013.01); *C04B 2235/5228* (2013.01); *C04B 2235/5232* (2013.01); *C04B 2235/5244* (2013.01);
(Continued)

(58) Field of Classification Search
None
See application file for complete search history.

(56) References Cited

U.S. PATENT DOCUMENTS

| | | | |
|---|---|---|---|
| 4,816,289 A * | 3/1989 | Komatsu | D01F 11/12 252/502 |
| 6,420,293 B1 | 7/2002 | Chang et al. | |

(Continued)

FOREIGN PATENT DOCUMENTS

| | | | |
|---|---|---|---|
| JP | H06287077 | * | 10/1994 |
| JP | H07091780 | * | 10/1995 |

(Continued)

OTHER PUBLICATIONS

Machine translation of JP2007070593, Mar. 2007, Yanagisawa et al.*
(Continued)

*Primary Examiner* — Shawn Mckinnon
(74) *Attorney, Agent, or Firm* — Reising Ethington P.C.

(57) ABSTRACT

Composite materials are provided that include nanostructures bound together by a binder material in a manner that provides the composite material with high strain capability and toughness. The nanostructures and binder material form a matrix material in which long fiber reinforcements may be embedded to form a structural composite material. The nanostructures may have relatively low aspect ratios, preventing entanglement during processing. The nanostructures can be arranged in an interconnected network to form a high free-volume skeletal structure within the matrix material that allows the nanostructures to flex and return to their original shapes. As applied to ceramic matrix composite (CMC) materials, this tough, flexible matrix material allows for full bonding of the matrix material with the fiber reinforcements so that CMC materials can realize the full potential of the (Continued)

reinforcing fibers and possess superior inter-laminar strength.

25 Claims, 3 Drawing Sheets

(51) Int. Cl.
| | |
|---|---|
| *C08K 7/22* | (2006.01) |
| *B82Y 30/00* | (2011.01) |
| *B32B 18/00* | (2006.01) |
| *C04B 35/80* | (2006.01) |
| *C04B 35/83* | (2006.01) |

(52) U.S. Cl.
CPC ............... *C04B 2235/5248* (2013.01); *C04B 2235/5264* (2013.01); *C04B 2235/5268* (2013.01); *C04B 2235/5272* (2013.01); *C04B 2235/5284* (2013.01); *C04B 2235/5288* (2013.01); *C04B 2235/5296* (2013.01); *C04B 2235/616* (2013.01); *C04B 2235/96* (2013.01); *C04B 2237/38* (2013.01); *C08K 2201/016* (2013.01); *Y10T 428/249924* (2015.04); *Y10T 428/249929* (2015.04)

(56) References Cited

U.S. PATENT DOCUMENTS

| | | | |
|---|---|---|---|
| 6,689,835 B2* | 2/2004 | Amarasekera et al. | 524/495 |
| 6,838,162 B1* | 1/2005 | Gruber | C04B 35/573 |
| | | | 428/293.4 |
| 6,875,374 B1 | 4/2005 | Zhan et al. | |
| 6,949,216 B2 | 9/2005 | Brice et al. | |
| 7,306,828 B2 | 12/2007 | Barrera et al. | |
| 7,390,593 B2* | 6/2008 | Yamamoto | B01J 20/20 |
| | | | 252/502 |
| 7,807,092 B2 | 10/2010 | Hong et al. | |
| 2003/0119920 A1* | 6/2003 | Wang et al. | 518/715 |
| 2004/0029706 A1* | 2/2004 | Barrera | B82Y 15/00 |
| | | | 501/99 |
| 2005/0281730 A1* | 12/2005 | Theriault | 423/448 |
| 2006/0062985 A1 | 3/2006 | Karandikar | |
| 2006/0269864 A1* | 11/2006 | Tarnawskyj et al. | 430/124 |
| 2007/0042901 A1* | 2/2007 | Kurose et al. | 502/180 |
| 2007/0128960 A1* | 6/2007 | Ghasemi Nejhad et al. | 442/59 |
| 2007/0158611 A1* | 7/2007 | Oldenburg | B22F 1/0025 |
| | | | 252/71 |
| 2007/0189953 A1* | 8/2007 | Bai | B82Y 30/00 |
| | | | 423/414 |
| 2007/0212538 A1* | 9/2007 | Niu | 428/367 |
| 2007/0248807 A1* | 10/2007 | Kaschak | B32B 5/18 |
| | | | 428/312.2 |
| 2007/0265379 A1* | 11/2007 | Chen | B82Y 30/00 |
| | | | 524/404 |
| 2008/0020193 A1* | 1/2008 | Jang et al. | 428/292.1 |
| 2008/0039569 A1* | 2/2008 | Asdal et al. | 524/424 |
| 2008/0213487 A1 | 9/2008 | Park et al. | |
| 2008/0219084 A1 | 9/2008 | Bae et al. | |
| 2008/0292854 A1* | 11/2008 | Miller et al. | 428/219 |
| 2009/0104386 A1* | 4/2009 | Barrera et al. | 428/34.1 |
| 2010/0024975 A1 | 2/2010 | Hecht | |
| 2011/0024694 A1 | 2/2011 | Shah et al. | |
| 2011/0124483 A1 | 5/2011 | Shah et al. | |
| 2011/0177322 A1 | 7/2011 | Ogrin et al. | |
| 2012/0164903 A1* | 6/2012 | Wardle | B32B 5/12 |
| | | | 442/189 |

FOREIGN PATENT DOCUMENTS

| | | | | |
|---|---|---|---|---|
| JP | 2002290094 A | | 10/2002 | |
| JP | 2003012939 | * | 1/2003 | |
| JP | 2007070593 | * | 3/2007 | |
| WO | WO2010105058 | * | 9/2010 | B32B 9/00 |

OTHER PUBLICATIONS

Machine translation of JP2003012939, Jan. 2003, Wadahara et al.*
Machine translation of JPH06287077, Kameda et al., Oct. 1994.*
Machine translation of JPH07091780, Okuyama et al., Oct. 1995.*
Owens Corning Glossary, http://composites.owenscorning.com/pdf/rft-guide/Composite_Solutions_Guide_page119-125.pdf, page visited on Sep. 13, 2016.*
Baker et al. (Composite Materials for Aircraft Structures, Second edition, 2004).*
Wang et al. ("Low-aspect Ration Graphite Hollow Structures", Royal Society of Chemistry, Sep. 12, 2013).*
Bin Li, et al., Highly Improved Mechanical and Tribological Properties in Nanofiber Composites, Society of Plastics Engineers, XP002697036, Jul. 21, 2010, 3 pages.
European Search Report, Application No. 12198677.4-1354, Applicant: Lockheed Martin Corporation, Dated Jun. 11, 2013 (Jun. 11, 2013), 6 pages.
Wikipedia Contributors, Ceramic matrix composite, Wikipedia, The Free Encyclopedia, Sep. 27, 2015, Available at: https://en.wikipedia.org/w/index.php?title=Ceramic_matrix_composite &oldid=683027835 (accessed Jan. 4, 2016).

* cited by examiner

STRUCTURAL COMPOSITE MATERIALS WITH HIGH STRAIN CAPABILITY

TECHNICAL FIELD

This application relates generally to structural composite material compositions that include nanostructures and methods for making such compositions.

BACKGROUND

Structural composites are materials that have generally been developed in attempts to combine desirable properties of two or more different types of materials. For example, reinforced plastic materials have been developed where the plastic material is a matrix material and the reinforcement is in the form of fibers or particles dispersed within the matrix material. In such reinforced plastic composite materials, the low density, toughness, and processability of the plastic matrix material is combined with the stiffness, strength, heat resistance, and relatively low cost of such reinforcements as glass fibers or mineral-based fillers. Reinforced concrete is another simple example of a structural composite material, where steel or other metal reinforcement bars (rebar) are aligned within a concrete matrix to impart some of the tensile strength of the rebar to the resulting material, where one of the most undesirable properties of unreinforced concrete is its exceptionally low tensile strength. Typically, such composite materials have overall mechanical properties that are a compromise between the combined materials governed in part by the so-called "rule of mixtures" that takes the contributions of the individual constituents into account. For example, a glass fiber-reinforced plastic is stronger that the plastic matrix, but weaker than the individual glass fibers. It is also tougher than the glass fibers, but not as tough as the plastic matrix. With these types of composites, efforts have been made to increase the matrix-to-fiber adhesion or "wetting" of the fibers with the matrix material so that stresses applied to the matrix material are shared with the stronger fibers.

Ceramic matrix composite (CMC) materials have been developed with similar objectives, but have evolved in different ways to address certain material properties. CMC materials include a ceramic matrix material and a ceramic reinforcement material, where the reinforcement material is typically in the form of long fibers. While the reinforcements are meant to impart some of their strength or other properties to the overall composite material, they are also provided to interrupt crack propagation through the matrix material, where cracking due to fatigue, impact, or thermal shock is a primary weakness of ceramic materials. Such controlled crack propagation is said to effectively "toughen" the matrix material, though the toughening mechanism does not involve the reinforcements themselves absorbing mechanical energy. Rather, mechanical energy is dissipated through relative movement at the matrix-fiber interface. In order for this type of toughening mechanism to work, the adhesion between the matrix material and the reinforcing fibers must be very low. Thus, with CMC materials, efforts are typically made to reduce the bonding between the matrix material and the reinforcing material in order to increase the effective fracture toughness. This can result in significantly lower mechanical properties than would normally be expected by the rule of mixtures and severe degradation of inter-laminar properties.

SUMMARY

According to one embodiment, a composite material is provided that includes a matrix material and a plurality of generally aligned long fiber reinforcements embedded in the matrix material. The matrix material comprises hollow nanostructures having an average aspect ratio that is in a range from about 1 to about 10.

According to another embodiment, a composite material is provided that includes nanotubes arranged together in an interconnected microstructure and a binder material holding the nanotubes in place relative to each other. The walls of adjacent nanotubes are in contact with each other at nanotube interconnections so that mechanical loads can be transferred from one nanotube to another.

According to another embodiment, a method of producing a composite material is provided that includes the steps of: (a) providing a plurality of nanostructures; and (b) binding the nanostructures together to form a matrix material. The nanostructures are in contact with each other but not entangled with each other throughout the matrix material.

BRIEF DESCRIPTION OF THE DRAWINGS

These and other features and advantages will become apparent to those skilled in the art in connection with the following detailed description and drawings of one or more embodiments, in which.

DETAILED DESCRIPTION

A new matrix material microstructure for use in CMC and other materials is disclosed herein. This approach utilizes the high elasticity of nanostructures as part of an overall composite material structure that has the ability to endure mechanical strain far in excess of known ceramic materials, which typically fail at strains of 0.10% or less, and in excess of known CMC materials, which typically fail at strains of 1.0% or less. A matrix material may include nanostructures that have certain characteristics, such as a hollow structure, a tubular shape, a low aspect ratio, a relatively small length, and/or a relatively large diameter or width, for example. The arrangement of nanostructures in the matrix material may take on certain characteristics as well, such as a skeletal or scaffold-like arrangement, nanostructure alignment, nanostructure disorder, and/or inter-nanostructure contact at load transfer points, for example. It should be noted that the figures are not necessarily to scale and that the representations of nanostructures and other materials in the figures are schematic representations.

Figure 1:
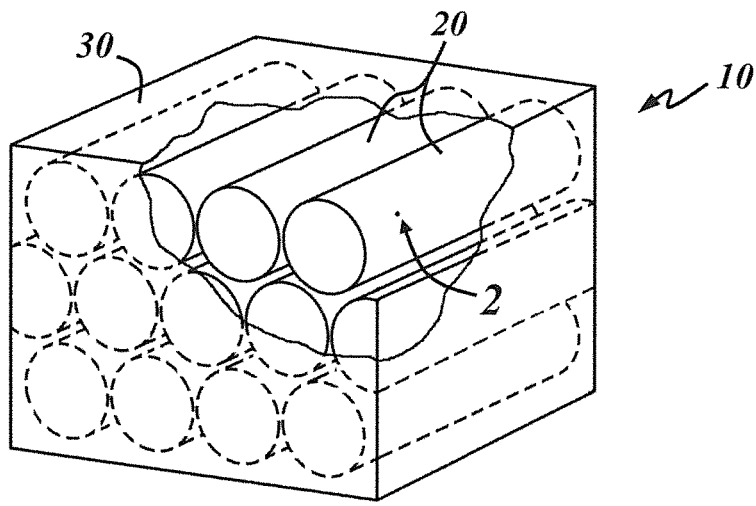
FIG. 1 is a partial cutaway view of a composite material including long fiber reinforcements embedded in a matrix material, according to one embodiment.

Referring now to FIG. 1, a portion of a composite material 10 is shown in a partial cutaway view, according to one embodiment. The composite material 10 includes a plurality of long fiber reinforcements 20 embedded in a matrix material 30. Both the reinforcements 20 and the matrix material 30 can be selected from a variety of materials to tailor the properties of the composite material 10. As used herein, long fiber reinforcements are reinforcements having a generally uniform cross-section along their longest dimension, a smallest cross-sectional dimension of about 5 μm or higher, and an aspect ratio higher than about 1000 with respect to the largest cross-sectional dimension. Reinforcement aspect ratios may be much larger, and in some embodiments is practically infinite where continuous fiber reinforcements are used. Fiber reinforcements may be formed from materials such as ceramics, metals, polymers, or glass. Some examples of suitable reinforcement materials for use in CMC materials include carbon, silicon carbide, alumina, quartz, and mixed oxide materials such as mullite (alumina-$SiO_2$). In one particular embodiment, the long fiber reinforcements have a diameter that ranges from about 5 μm to about 15 μm and are at least several centimeters in length.

In the illustrated embodiment, the long fiber reinforcements 20 are generally aligned with each other in the portion shown, which can impart the material 10 with directional properties, such as a higher tensile strength in the direction of alignment than in a direction transverse to the direction of alignment. Multiple layers of composite material having aligned reinforcements can be layered together to form a laminar composite article, where the reinforcements in each layer are oriented in a different direction from adjacent layers. For example, a first layer of composite material may have its reinforcements aligned as shown in FIG. 1, an overlying layer may have its reinforcements aligned at a 90 degree angle to the reinforcements of the first layer, another overlying layer may have its reinforcements aligned at a 45 degree angle to each of those two layers, etc. Some examples of such composite articles include structural components such as aircraft components, automobile components, building materials, etc. In some embodiments, individual layers of composite material include long fiber reinforcements oriented in multiple directions to yield isotropic property capability. In other embodiments, the long fiber reinforcements may be woven, braided, or otherwise arranged together to form a structure that can be practically handled in a manufacturing environment prior to being embedded in the matrix material and result in generally aligned reinforcements in the finished composite material. Skilled artisans will recognize the wide variety of long fiber reinforcement materials, shapes, and configurations that can be used consistent with the teachings presented herein.

Figure 2:
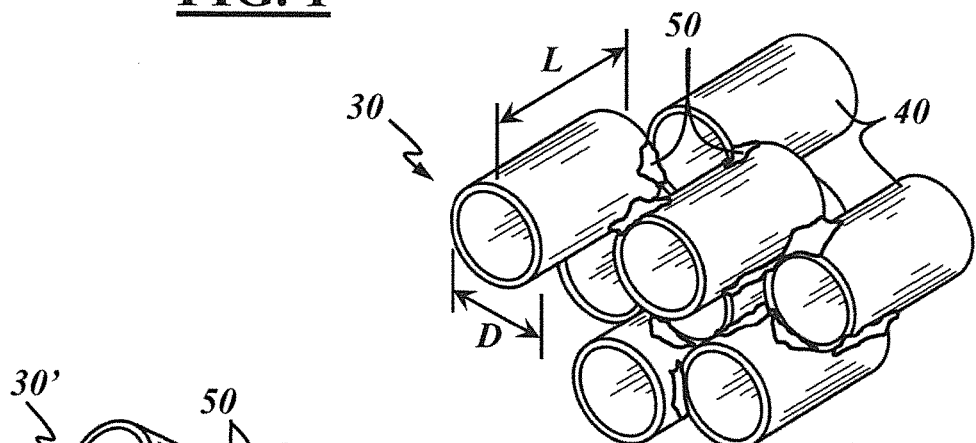
FIG. 2 is a schematic view of one embodiment of the matrix material of FIG. 1, including aligned, low aspect ratio nanostructures and binder material.

FIG. 2 depicts an enlarged view of a portion of the matrix material 30 of FIG. 1. The matrix material 30 includes nanostructures 40 and a binder material 50, and is thus itself a composite material. As used herein, a nanostructure is a structure having at least two orthogonal dimensions on a nanoscale, or less than about 500 nm. Nanotubes, nanowires, nanofibers, nanoparticles, and bucky balls are some examples of nanostructures. Carbon nanotubes (CNTs) are one type of nanostructure suitable for use as nanostructures 40 in the matrix material 30. CNTs, including single-wall nanotubes (SWNTs) and multi-wall nanotubes (MWNTs), are generally tube-shaped structures made up of graphene cylinders—i.e., cylinders of covalently bonded carbon atoms. For reasons discussed in more detail below, the nanostructures 40 are preferably hollow nanostructures such as the open-ended nanotubes of FIG. 2. Other hollow nanostructure shapes include closed-end nanotubes, nanospheres, nanocubes or nanoellipsoids, for example. Skilled artisans will of course recognize that hollow nanostructures may be formed from elements other than carbon, as well.

The binder material 50 interconnects adjacent nanostructures and holds them in place relative to each other to form the bulk matrix material 30. The binder material may include a ceramic material, a polymeric material, a metallic material, or any combination or compound thereof. In embodiments where the composite material is a CMC material, the binder material 50 includes or is a ceramic material having a composition similar to known CMC matrix materials, such as carbon, silicon carbide, alumina, or mixed oxide materials. Ceramic binder materials may be provided in the form of a liquid binder formulation that is further processed to become binder material 50 in the finished composite material. The amount of binder material 50 in the matrix material 30 may vary from the illustration. The binder material 50 need only be present in an amount to bind adjacent nanostructures to one another, but may be increased to increase material stiffness to desired levels. The binder material 50 may be present as nanofillets at nanostructure interconnections, as shown in FIG. 2, where adjacent nanostructures are in contact with each other and are able to transfer loads from one to the other. This may be desirable with ceramic binder materials for reasons discussed in more detail below. In other embodiments, where the binder material is polymeric for example, the binder material may be present in a greater amount to fill a larger portion of the volume defined by the nanostructure exterior surfaces. In some cases, the binder material may be present in an amount that spaces individual nanostructures from one another so that they are not in contact with each other and do not directly transfer loads from one to another.

As shown in FIG. 2, the nanostructures 40 and the binder material 50 may be arranged together in an interconnected microstructure to at least partly define the matrix material 30. The nanostructures 40 may be characterized at least in part by an aspect ratio. The aspect ratio of a nanostructure is its length divided by its width. For generally tubular or prismatic nanostructures, the length is the axial or longitudinal dimension, and the width is the largest radial or transverse dimension. For generally tubular nanostructures, width refers to diameter, as used herein. For the tubular nanostructures 40 depicted in FIG. 2, the aspect ratio is L/D. Nanostructures 40 preferably have an aspect ratio that ranges from about 1 to about 10. In one embodiment, the aspect ratio of the nanostructures 40 is in a range from about 3 to about 5. These relatively low aspect ratios are unconventional for use in known composite materials where very high aspect ratios (e.g., very long and thin CNTs) were previously thought to maximize nanostructure property contribution to the composite material through maximized surface contact with other composite material constituents. Low aspect ratio, cylindrical nanotubes, such as those depicted in FIG. 2, may be referred to as nanoziti. Nanocups, discussed in further detail below, are another type of nanotube that can have a low aspect ratio, along with a diameter that is larger at one end of the nanotube than the other.

Among other advantages that may be realized by the use of low aspect ratio nanostructures as part of matrix material 30 is enhanced processability. For example, unusually high nanostructure content can be achieved in the liquid binder formulation or precursor, such as a pre-ceramic polymer in the case of a ceramic binder material. More conventional nanostructures such as long CNTs with higher aspect ratios have been limited to low loadings in molten polymers and metals and in pre-ceramic polymer formulations because their spaghetti-like configurations tend to cause nanostructure entanglement and clumping while flowing in a liquid medium. With the already high surface area of nanostructures, this can lead to viscosities that are too high for effective material processing. Thus, the low aspect ratio nanostructures disclosed herein as part of the matrix material may be characterized by their non-entanglement during processing and in the finished composite material.

Nanostructures 40 may also be characterized in terms of their length and/or width. In one embodiment, the nanostructures 40 have an average width that ranges from about 10 nm to about 200 nm. In another embodiment, the nanostructures 40 have an average width that ranges from about 25 nm to about 100 nm. These nanostructure width ranges, while non-limiting, are unconventional for nanostructures in composite materials, where a typical CNT may have a diameter of about 1-2 nm and a length that is about 4 to 6 orders of magnitude larger. These larger widths or diameters reduce the surface area of a given amount (mass or volume) of nanostructures, decreasing their limitations on processing compared to typical 1 to 2 nm diameter nanotubes. For example, typical CNTs have an overall nanostructure surface area that ranges from 500-600 $m^2/g$. For use in a typical pre-ceramic polymer formulation, the nanostructure surface area should generally be less than about 10 $m^2$/gram of formulation for processability. Preferably, the nanostructure surface area is in a range from about 2 $m^2/g$ to about 4 $m^2/g$, where the lower the nanostructure surface area in the formulation, the easier it is to process.

Consistent with the preferred aspect ratios described above, nanostructure length may range from about 10 nm to about 2 μm, from about 25 nm to about 1 μm, or from about 75 nm to about 500 nm. In composite materials having fiber reinforcements, it may be preferable that the maximum dimension of the nanostructures is about 10% or less than that of the width of the fiber reinforcements, and more preferably about 5% or less. For example, where fiber reinforcements having diameters of about 10 μm are present in the composite material, nanostructure lengths of less than about 1 μm are preferred, and nanostructure lengths of less than about 500 nm are more preferred. While these nanostructure length dimensions are non-limiting examples, preferred lengths may help facilitate infiltration of the nanostructures into the spaces between adjacent reinforcement fibers. In one particular embodiment, the nanostructures 40 are nanotubes with an average diameter of about 25 nm and an average length of about 100 nm. In another particular embodiment, the nanotubes have an average diameter of about 100 nm and an average length of about 400 nm. These are of course only specific examples of nanostructure dimensions suitable for use in matrix material 30.

While the figures are not necessarily to scale, in order to illustrate approximate relative sizes of individual composite material constituents, the same portion of matrix material 30 shown in FIG. 2, including the several nanostructures 40 depicted therein, has been approximately scaled and superimposed on FIG. 1 where it shows up as a dot with arrow 2 pointing toward it. The scaling simulates and approximates long fiber reinforcements 20 at about 10 μm in diameter relative to the group of nanostructures 40 from FIG. 2 each at about 100 nm in diameter. In one embodiment, the composite material 10 in FIG. 1 can be envisioned with the entire block of matrix material 30—that is, the entire portion of composite material 10 of FIG. 1 except for the volume occupied by the long fiber reinforcements 20—being composed of an interconnected network of nanostructures with their exterior surfaces in contact with adjacent nanostructure surfaces. The network is bound together at least at the interconnection points by binder material 50, forming a matrix material 30 with continuous inter-nanostructure load paths, where an applied load can be transferred directly from one nanostructure to one or more other adjacent nanostructure(s). This type of microstructure, including a network or skeleton of interconnected nanostructures, is also unconventional in composite materials that include nanostructures. As previously noted, processing limitations typically do not allow for high enough nanostructure loading in a precursor material for the finished composite material to include continuous load paths directly from nanostructure to nanostructure. Additionally, the nanostructure network as a load-bearing network is unconventional, as nanostructures are typically added to composite materials as a low percentage filler material like conventional impact modifiers, fibers, or other property enhancers in the plastics industry.

The matrix material 30 of FIG. 2 may be characterized by a very high free volume due to the hollow nanostructures and/or a relatively small or minimized amount of binder material. The free volume of the bulk matrix material 30 of the finished composite may range from about 50% free volume up to about 99% free volume, resulting in a matrix material that is extremely porous or foam-like and, accordingly, lightweight. As described in more detail below, a composite material including both a highly flexible and high free volume matrix material may possess superior strain capability, fatigue life, toughness, and/or other material properties when compared to conventional composite materials having similar overall chemical compositions.

Figure 3:
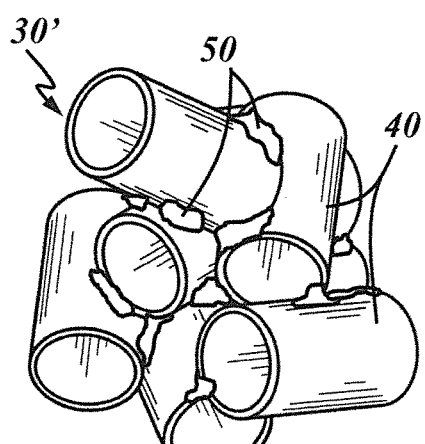
FIG. 3 is a schematic view of another embodiment of the matrix material of FIG. 1, including randomly oriented, low aspect ratio nanostructures and binder material.

The illustrative matrix material 30 of FIG. 2 shows nanostructures 40 that are generally aligned with each other. FIG. 3 shows a different embodiment of the matrix material 30' where the nanostructures are randomly oriented. While neither embodiment is considered superior to the other, each may include its own advantages and disadvantages. For example, randomly oriented nanostructures may result in a matrix material with more isotropic properties, while aligned nanostructures may result in a matrix material with better strain capabilities through some of the mechanisms outlined below. In some cases, the composite material includes regions of aligned nanostructures and regions of randomly oriented nanostructures. There may also be several degrees of alignment possible between the perfectly aligned embodiment of FIG. 2 and the completely random embodiment of FIG. 3. Alignment may be controlled during material processing through viscosity, material flow rates, etc. and/or may be controlled by nanostructure characteristics such as nanostructure size or shape distribution.

Figures 4A, 4B, 4C:
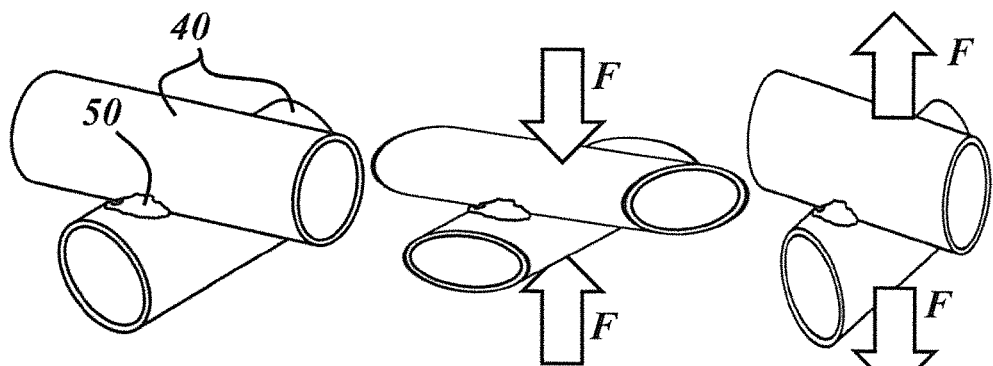
FIGS. 4A-4C are schematic views of the interaction between adjacent nanostructures of a matrix material showing elastic deformation in both compression and tension.

Turning now to FIGS. 4A-4C, a load bearing mechanism of the matrix material can be described. FIG. 4A depicts a pair of nanostructures 40 bound together by binder material 50 in an unloaded state. FIG. 4B depicts the same pair of nanostructures subjected to compressive load F, and FIG. 4C depicts the same pair of nanostructures subjected to tensile load F. The nanostructures 40 are allowed to deform under load due to the free internal volume of the nanotube shape and the free volume external to the nanostructures. This type of deformation mechanism where individual nanostructures are arranged to transfer loads from one directly to another may result in composite materials with unusually high strain capability. For example, nanotubes such as CNTs have been shown to have the ability to be compressed beyond the point of buckling and to elastically recover their cylindrical shape, due in part to the resilience of the carbon-carbon bonds. Additionally, nanotubes such as CNTs have demonstrated strain values in excess of 10%. A matrix material having sufficient free volume can allow the nanostructures freedom of movement to more fully utilize their high strain and elastic characteristics. This may particularly be the case where the binder material 50 comprises a ceramic material, which will typically fail at very low strain values. Where used in a more conventional manner as a filler material distributed within in a ceramic material matrix with less free volume, nanotubes are unable to demonstrate their flexibility in the manner taught herein.

A ceramic-based matrix material, with ceramic binder material interconnecting a deformable network of nanostructures with load paths formed through the nanostructure network, may effectively absorb impact loads, endure fatigue cycles and thermal shocks, and be overall less brittle when compared to the ceramic binder material itself. These enhanced properties of the matrix material over known matrix materials, particularly with respect to CMC materials, can offer other benefits to the overall composite material. For instance, a CMC material having a matrix material according to the teachings presented herein may be formed so that the ceramic fiber reinforcements are bound to the matrix material. That is to say that the high toughness matrix materials described here may not require intentional fiber-to-matrix bond suppression to achieve the desired composite material properties. In fact, composite materials that employ the more ductile matrix materials described above can be formed so that fiber-to-matrix adhesion is promoted, thus taking greater advantage of the mechanical properties of the fiber reinforcements and/or moving composite material failure modes to the fiber reinforcements where material properties are more predictable. In the context of laminar composites having multiple layers of long-fiber reinforced composite material, movement of material failure modes from the matrix material to the fibers also means that interlaminar material properties are substantially improved. Specific composite material properties, such as strength properties per unit mass, are even further enhanced due to the lightweight, high free volume microstructure of the matrix material. Exemplary CMC matrix material properties include a modulus of elasticity in a range from about 25,000 psi to about 3,000,000 psi. Preferably, the matrix material has a modulus of elasticity in a range from about 250,000 psi to about 1,000,000 psi. Strain to failure of the matrix material may be about 5% or higher, far in excess of typical ceramic matrices.

Figure 5:
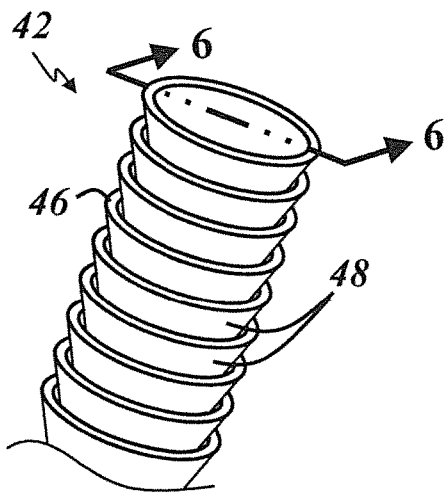
FIG. 5 is a schematic view of a nanostructure having a stacked-cup morphology.
Figure 6:
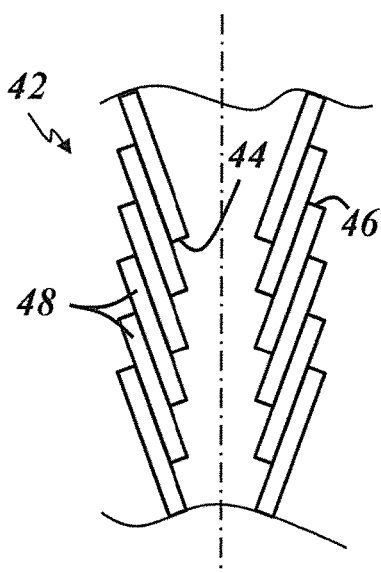
FIG. 6 is a partial lengthwise cross-section of the nanostructure of FIG. 5.
Figure 7:
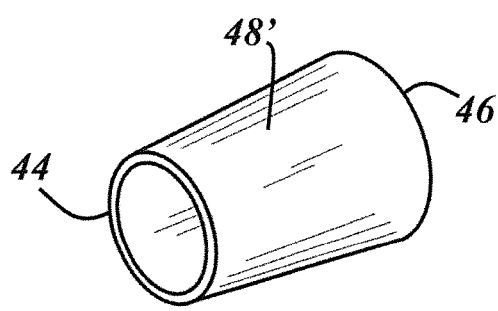
FIG. 7 is a schematic view of a low aspect ratio nanostructure derived from the nanostructure of FIG. 5.

FIGS. 5-7 illustrate some specific examples of nanostructures that may be useful in forming the matrix materials described above. FIG. 5 shows a portion of a nanostructure 42 that has a stacked-cup morphology, and FIG. 6 shows a cross-section of the same nanostructure 42. The illustrated nanostructure 42 is hollow and generally cylindrical, but differs from single-wall nanotubes and multi-wall nanotubes in that it includes a plurality of interior and exterior free edges 44, 46 along its length corresponding to multiple overlapping cup-shaped segments 48. While certain stacked-cup nanostructures may be suitable for use in the above-described matrix materials, one embodiment of the matrix material includes individual cup-shaped nanostructures or nanocups 48', such as that shown in FIG. 7, that can be derived from the stacked-cup nanostructure of FIGS. 5 and 6. While cup-shaped or frustoconical in shape, with a diameter that increases between edges 44 and 46, nanostructure 48' is generally tubular like the nanostructures depicted in previous figures. A stacked-cup nanostructure can be broken into its smaller individual cup-shaped segments through various mechanical, chemical or other means. One stacked-cup nanostructure that may be used to form nanostructures suitable for use in the composite matrix material is a stacked-cup carbon nanotube (SCCNT), available from Pyrograf Products, Inc. (Columbus, Ohio) under the Pyrograf III family of products.

In one embodiment, nanostructures are provided as pre-formed nanostructures and broken into shorter segments or reduced to the desired aspect ratio by high energy attrition mill action with re-circulation. This process can be used to reduce the length of nanotubes to achieve the desired aspect ratio, or to break stacked-cup nanostructures into nanocup form like that shown in FIG. 7 while ensuring uniform size reduction. Alternatively, pre-formed nanostructures may be passed through tapered roller bearings under load to break them into shorter segments. Multiple passes through the roller bearings may be required to obtain uniform low aspect ratio nanostructures. Bearing load and material may also affect the ability of this mechanical process to obtain nanotubes having the desired aspect ratio. In one embodiment, the bearing material is zirconia ($ZrO_2$). Chemical intercalation with subsequent exfoliation may also be used to disrupt the bonds within stacked-cup nanostructures where the individual cup-shaped segments overlap each other to form nanocups. Other known methods can be used to reduce the size of various types of nanostructure for use in the matrix material.

This is of course only one manner of obtaining suitable nanostructures for the matrix material. Nanostructures with the desirable aspect ratios, lengths, diameters, compositions, and configurations may be provided by other means. For example, nanotubes having a low aspect ratio may be formed by terminating conventional nanotube growth processes sooner than normal—i.e., when the nanotubes have grown to the desired length. Nanostructures having high aspect ratios may be chopped, milled, or chemically reduced to shorter lengths and lower aspect ratios. In some embodiments, the nanostructures may be chemically altered or functionalized prior to incorporation into the matrix material. Such alterations to the nanostructures may promote binder material adhesion with the nanostructures, may affect the degree of alignment of the nanostructures in the matrix material, or may prevent entanglement of longer nanostructures, for example.

Where the composite material is a CMC material and/or is used to form composite articles or components, conventional CMC processing techniques may be used with certain modifications. CMC processing is a complex and multi-stage process that can vary widely from one material type to another and from one type of final component to another. The process description below is simplified to highlight the steps of the process that may be altered relative to conventional processes in order to produce one or more embodiments of the above-described composite materials. Skilled artisans will understand at or between which stages shaping and layering steps can be included, thus the following description is without regard for the shape of the desired finished component that comprises the composite material.

Figure 8:
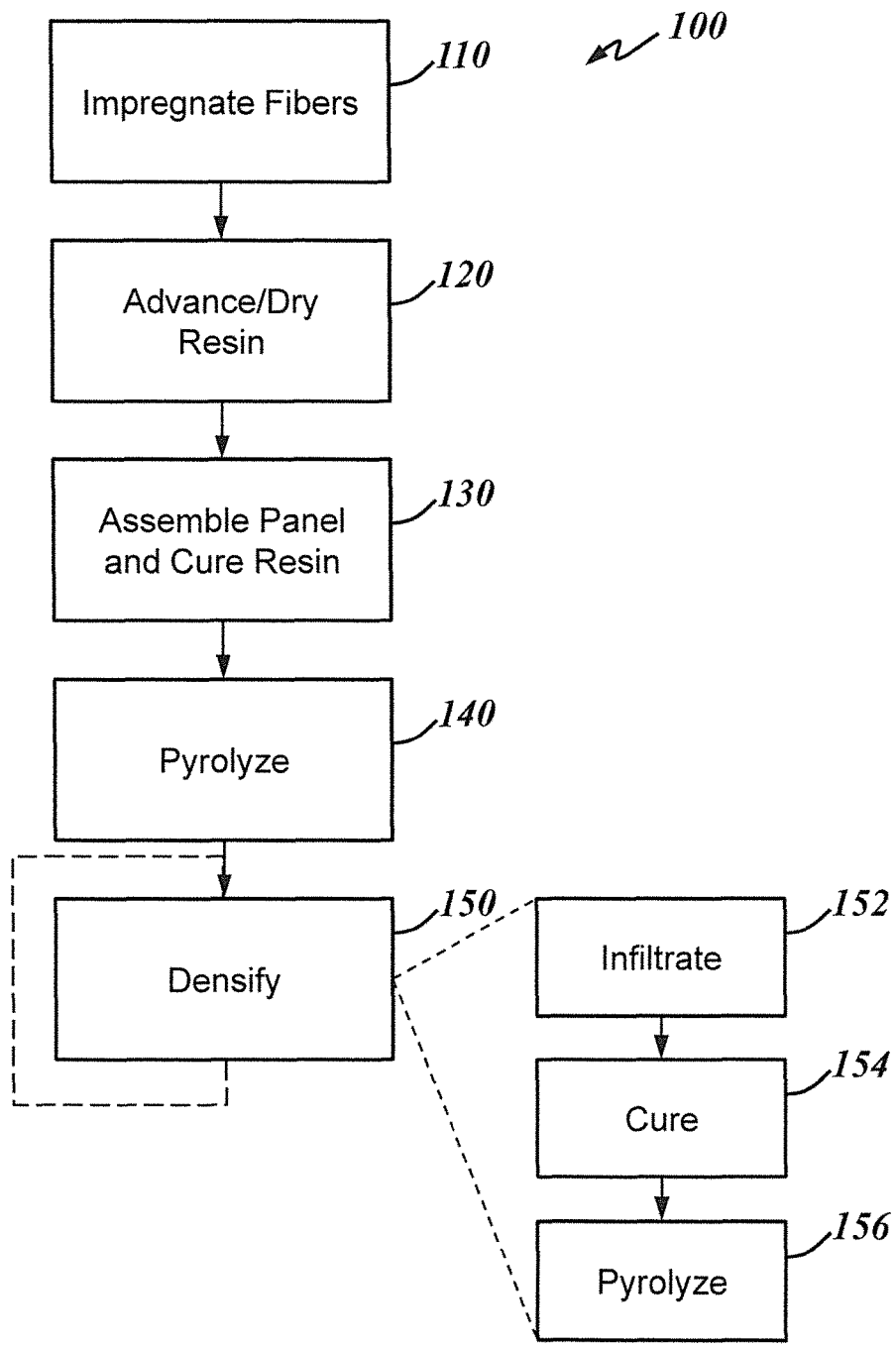
FIG. 8 is a process flowchart illustrating an example of a CMC material manufacturing process.

FIG. 8 shows an illustrative CMC material process 100 that includes impregnating a layer or bundle of fiber reinforcements with a matrix material mixture (step 110), at least partially advancing or otherwise transforming the matrix material mixture (step 120) to a less fluid form (sometimes referred to as a prepreg material), assembling a composite panel and curing the resin (step 130), and subjecting the prepreg material to a pyrolysis process to form the ceramic matrix material in place in and about the bundle of fibers (step 140). One or more additional steps 150 that include infiltrating the formed material with additional binder material mixture (step 152), curing the matrix (binder) material (step 154), and subsequently pyrolyzing it to form additional ceramic matrix material (step 156) may be included as well. These additional infiltration/cure/pyrolysis steps can be repeated any number of times and may be referred to as densification steps, where the intent is to reduce the porosity (increase the solidity) of the matrix material, as material porosity may be too high after the first pyrolysis reaction due to chemical losses and shrinkage and/or vaporization of resin formulation constituents.

In the context of composite materials having a matrix material with nanostructures, the matrix material mixture of step 110 includes the nanostructures dispersed in a liquid resin formulation. Where the desired composite material is a CMC material, the liquid resin formulation includes a typical pre-ceramic polymer chemistry and/or constituents that react to become a pre-ceramic polymer. During pyrolysis, the pre-ceramic polymer becomes the binder material. The formulation may also include solvents and/or other additives that improve processability (e.g., promote material flow within the bundle of fibers), enhance the final properties of the material, or assist with nanostructure arrangement during processing. Where high free volume matrix materials are desired, the constituents and the relative amounts of constituents of the liquid resin formulation may depart from known formulations. In particular, the liquid resin formulation may include a higher fugitive material content than is typical in conventional CMC pre-ceramic polymer formulations. For example, the solvent content of the liquid resin formulation may be higher than is conventional to reduce the viscosity of the nanostructure-laden matrix material mixture and act as a removable carrier material for the nanostructures and the pre-ceramic polymer. The formulation may also include low char-value materials in viscous liquid or solid form that survive through curing or solidification of the matrix material mixture but are subsequently vaporized in pyrolysis.

The inclusion of fugitive content in the liquid resin formulation is contrary to known methods, which normally seek to minimize material loss during cure and pyrolysis to minimize the number of densification cycles for faster processing and less process-induced stress in the material. High fugitive material content in the liquid resin formulation may require longer or more aggressive cure cycles (e.g., more vacuum or higher temperature) to drive off solvent. But pyrolysis cycle times may be reduced due to the lower amount of cured pre-ceramic polymer present at that stage of the process and/or more rapid off-gassing being promoted by the high free volume of the matrix material to allow rapid off-gassing. Pyrolysis may require only hours rather than the multiple numbers of days sometimes required in conventional CMC processes. As used in the context of the high free volume composite materials described herein, solidification during cure refers to the impregnated fiber bundle as a whole—i.e., the impregnated bundle can be handled as a solid material. In other words, after cure, the material may be handled as a solid, but may have a microstructure with voids or porosity due to some of the fugitive materials having been driven off.

In one embodiment, the long fiber reinforcements are not subjected to a treatment that reduces the surface adhesion, functionality, or surface energy of the reinforcements before impregnation. In other words, fiber reinforcements may be used as received from fiber manufacturers or as produced without the need for surface defunctionalizing or other treatments designed to reduce the adhesion of the matrix material to the fibers. This type of toughening mechanism may not be necessary with the high strain matrix materials described herein. In some cases, the fiber reinforcements may undergo surface treatments or other processes intended to increase the surface energy of the fibers for better adhesion with the matrix material. This may be the case, for example, where the fibers are subjected to thermal stabilization processes or other processes that defunctionalize the fiber surfaces as a process side-effect. It may also be desirable to increase matrix-to-fiber adhesion above and beyond that which is achievable using untreated fibers due to the smaller amount of binder material available in a high free volume matrix material.

Any densification steps performed on such nanostructure-based CMC materials may use a different formulation of matrix material mixture to infiltrate the pyrolyzed material. In particular, the infiltration of the composite material for densification may be performed with a modified version of the liquid resin formulation without nanostructures and/or with higher fugitive material content (e.g., higher solvent content). Additionally, fewer densifications steps may be desired where high free volume matrix materials are being produced and the amount of binder material in the finished material is minimized.

Where the nanostructures of the matrix material are tubular, free volume can be tailored, at least in part, based on the diameter of the nanotubes selected for inclusion in the material, and on the relative amount of binder material included in the finished material. Consistent with the above-described above methods, binder material content may be controlled by varying the relative proportion of pre-ceramic polymer and fugitive materials in the liquid resin formulation and/or the number of densification cycles. Table 1 shows the theoretical free volume of the matrix material as a function of nanotube diameter and with two different binder material contents. For purposes of Table 1, a nanotube is assumed to have a wall thickness of 0.335 nm. The column 1 of Table 1 shows the volume fraction ($V_f$) of a unit volume of matrix material occupied by the nanotube wall as a function of nanotube diameter. As nanotube diameter increases, the volume fraction of the matrix material occupied by the nanotube wall decreases. Column 2 of Table 1 shows the volume fraction of a unit volume of matrix material occupied by the nanotube wall together binder material, where binder material is present in an amount that is twice the volume occupied by the nanotube wall. The associated free volume of the matrix material is shown in the column 3. Columns 4 and 5 tabulate similar values where the amount of binder material present in the matrix material has a volume that is eight times the volume occupied by the nanotube wall. As may become apparent from Table 1, larger nanotube diameter may allow for a broader range of binder material content to achieve high free volumes—i.e., smaller nanotube diameter causes the amount of binder material in the final matrix material to have a greater effect on matrix material free volume.

TABLE 1

| Nanotube diameter (nm) | 1 $V_f$: Nanotube | 2 $V_f$: Nanotube + 2X Binder | 3 Free Volume | 4 $V_f$: Nanotube + 8X Binder | 5 Free Volume |
|---|---|---|---|---|---|
| 10 | 10.5% | 31.6% | 68.4% | 94.7% | 5.3% |
| 25 | 4.2% | 12.6% | 87.4% | 37.9% | 62.1% |
| 50 | 2.1% | 6.3% | 93.7% | 18.9% | 81.1% |
| 70 | 1.5% | 4.5% | 95.5% | 13.5% | 86.5% |

TABLE 1-continued

| Nanotube diameter (nm) | 1 $V_f$: Nanotube | 2 $V_f$: Nanotube + 2X Binder | 3 Free Volume | 4 $V_f$: Nanotube + 8X Binder | 5 Free Volume |
|---|---|---|---|---|---|
| 100 | 1.1% | 3.2% | 96.8% | 9.5% | 90.5% |
| 150 | 0.7% | 2.1% | 97.9% | 6.3% | 93.7% |
| 200 | 0.5% | 1.6% | 98.4% | 4.7% | 95.3% |

Such high free volume matrix materials are highly porous and may be referred to as ceramic foams, where the binder material is ceramic-based. Where the ceramic binder material is carbon and the nanostructures are carbon-based, the matrix material may be referred to as a carbon foam. Where these highly porous materials are employed in structural applications, particularly in outdoor applications that expose the materials to weathering (e.g., aircraft wings, automobile applications, wind turbines blades, etc.), a protective paint film or other sealing material may be applied over the component surface. In some cases, such films or sealant layers may include apertures or other openings formed therethrough as pressure equalization elements.

Though presented in the context of CMC materials with an interconnected network of low aspect ratio nanotubes as a flexible component of a high free volume matrix material, the above teachings are by no means limited to such specific composite materials. For example, these teachings will enable skilled artisans to use low aspect ratio nanostructures as a component of any sort of composite material as a way of solving problems such as nanotube entanglement and clumping, whether or not the composite materials include long fiber reinforcements or whether the matrix material is ceramic-based, polymer-based, or metal-based. Further, these teachings will enable skilled artisans to arrange nanostructures in an interconnected network to more fully utilize some of the advantageous properties of nanostructures, regardless of nanostructure aspect ratio, matrix material type, or the inclusion of reinforcing fibers. For example, other methods of suppressing nanotube entanglement may be used along with large diameter nanotubes to form materials with continuous load paths through a nanotube network.

It is to be understood that the foregoing is a description of one or more illustrative embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A ceramic matrix composite material, comprising:
a ceramic matrix material; and
a bundle of long fiber reinforcements that are generally aligned with one another along the length of the reinforcements, the bundle being embedded in the matrix material,
wherein the ceramic matrix material comprises hollow nanostructures and a ceramic binder material that interconnects adjacent nanostructures, the nanostructures having an average aspect ratio that is in a range from about 1 to about 10,
wherein nanostructures of the ceramic matrix material are bound to the long fiber reinforcements by the ceramic binder material, and
wherein the hollow nanostructures are dispersed throughout the ceramic matrix material, including at locations away from the long fiber reinforcements.

2. The composite material of claim 1, wherein the nanostructures include at least one of nanocups or nanoziti.

3. The composite material of claim 1, wherein the average aspect ratio is about 5 or less.

4. The composite material of claim 1, wherein the nanostructures have an average length that is in a range from about 10 nm to about 2 µm.

5. The composite material of claim 1, wherein the nanostructures have an average width that is in a range from about 10 nm to about 200 nm.

6. The composite material of claim 1, wherein the matrix material has a free volume in a range from about 50% to about 99%.

7. The composite material of claim 1, wherein the matrix material includes continuous inter-nanostructure load paths.

8. A carbon-carbon ceramic matrix composite material according to claim 1, wherein the long fiber reinforcements are carbon fiber reinforcements and the ceramic matrix material is an interconnected network of carbon nanotubes bound together with a carbon-based binder material.

9. A composite material, comprising:
nanotubes arranged together in an interconnected microstructure, wherein walls of adjacent nanotubes are in contact with each other at nanotube interconnections so that mechanical loads can be transferred from one nanotube to another;
a ceramic binder material located along the walls of the nanotubes at the nanotube interconnections holding the nanotubes in contact with each other at the nanotube interconnections, wherein the nanotubes in contact with each other are not entangled with each other; and
long fiber reinforcements embedded in the interconnected microstructure of nanotubes, wherein the nanotubes are dispersed throughout the composite material, including at locations away from the long fiber reinforcements, and
wherein the material defined by the nanotubes and the binder material has a free volume in a range from about 50% to about 99%, a portion of the free volume being within the nanotubes and the remainder of the free volume being outside of the nanotubes.

10. The composite material of claim 9, wherein the nanotubes have an average aspect ratio of about 10 or less and an average diameter of about 10 nm or more.

11. The composite material of claim 9, wherein the nanotubes are arranged so that they are aligned with each other in at least a portion of the interconnected microstructure.

12. The composite material of claim 9, wherein the nanotubes are arranged with random orientations with respect to each other in at least a portion of the interconnected microstructure.

13. The composite material of claim 9, wherein the interconnected microstructure of nanotubes at least partly defines a matrix material of the composite material, and the long fiber reinforcements are embedded in the matrix material to form a ceramic matrix composite (CMC) material, the long fiber reinforcements having a smallest cross-sectional dimension of at least 5 µm and an aspect ratio of at least 1000.

14. The composite material of claim 13, wherein the matrix material of the CMC material is bonded with the long fiber reinforcements to prevent relative movement at an interface between the matrix material and the long fiber reinforcements.

15. A laminar composite article comprising a plurality of layers of the composite material of claim 14 layered together, wherein the long fiber reinforcements of at least two adjacent layers are oriented in different directions.

16. A structural aircraft component according to claim 15.

17. The composite material of claim 1, wherein the entire composite material except for the volume occupied by the long fiber reinforcements is the ceramic matrix material, and the ceramic matrix material is the hollow nanostructures arranged in an interconnected network with exterior surfaces of adjacent nanostructures in contact with one another at interconnection points and bound together at the interconnection points by the ceramic binder material.

18. The composite material of claim 1, wherein the nanostructures are in contact with each other but not entangled with each other throughout the composite material.

19. The composite material of claim 1, wherein the long fiber reinforcements have functionalized surfaces to promote adhesion between the ceramic matrix material and the long fiber reinforcements.

20. A structural aircraft component comprising a laminar composite article comprising a plurality of layers of the composite material of claim 1 layered together, wherein the long fiber reinforcements of at least two adjacent layers are oriented in different directions.

21. The composite material of claim 1, wherein the ceramic matrix material of the ceramic matrix composite material has a modulus of elasticity in a range from 25,000 psi to 3,000,000 psi.

22. The composite material of claim 9, wherein the nanotubes and the binder material at least partly define a ceramic matrix material having a modulus of elasticity in a range from 25,000 psi to 3,000,000 psi.

23. A ceramic matrix composite (CMC) material, comprising:
a ceramic matrix material comprising hollow nanostructures; and
ceramic fiber reinforcements embedded in the ceramic matrix material, the ceramic fiber reinforcements having a smallest cross-sectional dimension of at least 5 µm and an aspect ratio of at least 1000, wherein the ceramic matrix material and the ceramic fiber reinforcements are bound together at an interface between the matrix material and the ceramic fiber reinforcements to prevent relative movement at the interface,
wherein the ceramic matrix material has a free volume in a range from about 50% to about 99%, a portion of the free volume being within the hollow nanostructures and the remainder of the free volume being outside of the hollow nanostructures, and
wherein the hollow nanostructures are dispersed throughout the ceramic matrix material, including at locations away from the ceramic fiber reinforcements.

24. The ceramic matrix composite (CMC) material of claim 23, wherein the ceramic matrix material comprises a ceramic binder material that binds the hollow nanostructures of the ceramic matrix material to the ceramic fiber reinforcements at said interface.

25. The composite material of claim 1, wherein the long fiber reinforcements have a smallest cross-sectional dimension of at least 5 µm and an aspect ratio of at least 1000.

* * * * *